(12) United States Patent
Shudark et al.

(10) Patent No.: US 9,974,014 B2
(45) Date of Patent: May 15, 2018

(54) SYSTEM AND METHOD FOR MAINTAINING SYNCHRONIZATION WITH LOW POWER ENDPOINTS IN A TIME SYNCHRONIZED CHANNEL HOPPING NETWORK

(71) Applicant: LANDIS+GYR INNOVATIONS, INC., Alpharetta, GA (US)

(72) Inventors: Jeffrey Shudark, Cumming, GA (US); Christopher Calvert, Roswell, GA (US)

(73) Assignee: LANDIS+GYR INNOVATIONS, INC., Alpharetta, GA (US)

( * ) Notice: Subject to any disclaimer, the term of this patent is extended or adjusted under 35 U.S.C. 154(b) by 111 days.

(21) Appl. No.: 14/631,922

(22) Filed: Feb. 26, 2015

(65) Prior Publication Data

US 2015/0245287 A1 Aug. 27, 2015

Related U.S. Application Data

(60) Provisional application No. 61/966,648, filed on Feb. 26, 2014.

(51) Int. Cl.
| | | |
|---|---|---|
| *H04W 52/02* | (2009.01) | |
| *H04W 72/04* | (2009.01) | |
| *H04W 56/00* | (2009.01) | |

(52) U.S. Cl.
CPC ... *H04W 52/0206* (2013.01); *H04W 52/0216* (2013.01); *H04W 52/0219* (2013.01);
(Continued)

(58) Field of Classification Search
None
See application file for complete search history.

(56) References Cited

U.S. PATENT DOCUMENTS

| | | | |
|---|---|---|---|
| 6,865,609 B1* | 3/2005 | Gubbi | ............... H04L 29/06 370/349 |
| 2010/0034159 A1* | 2/2010 | Shin | ............... H04W 72/1257 370/329 |

(Continued)

FOREIGN PATENT DOCUMENTS

| | | |
|---|---|---|
| EP | 2227062 | 9/2010 |
| WO | 2009018212 | 2/2009 |

(Continued)

OTHER PUBLICATIONS

PCT/US2015/017625, "International Search Report and Written Opinion", dated May 29, 2015, 11 pages.

(Continued)

*Primary Examiner* — Huy D Vu
*Assistant Examiner* — Hong Shao
(74) *Attorney, Agent, or Firm* — Kilpatrick Townsend & Stockton LLP

(57) ABSTRACT

Systems and methods are provided for maintaining a low power endpoint (LPE) synchronized on a time synchronized channel hopping network (TSCH). An LPE receives a guaranteed time slot (GTS) from a parent node. The LPE determines a wake-up time that coincides with or is prior to the GTS. The LPE enters a low power mode to conserve power until the wake-up time occurs. At that time, the LPE enters a regular power mode and may communicate with the parent node.

20 Claims, 5 Drawing Sheets

(52) U.S. Cl.
CPC ..... *H04W 56/001* (2013.01); *H04W 56/0015* (2013.01); *H04W 72/0446* (2013.01); *Y02D 70/00* (2018.01); *Y02D 70/144* (2018.01); *Y02D 70/22* (2018.01)

(56) References Cited

U.S. PATENT DOCUMENTS

| | | | |
|---|---|---|---|
| 2010/0158494 A1* | 6/2010 | King | G03B 17/00 396/56 |
| 2010/0329232 A1* | 12/2010 | Tubb | E05B 39/00 370/345 |
| 2012/0320881 A1 | 12/2012 | Hong et al. | |
| 2014/0003401 A1* | 1/2014 | Lim | H04W 72/0446 370/336 |

FOREIGN PATENT DOCUMENTS

| | | |
|---|---|---|
| WO | 2011154911 | 12/2011 |
| WO | 2015130869 | 9/2015 |

OTHER PUBLICATIONS

Kang et al., "IEEE 802.15-08-409-04-004e; Time Slotted, Channel Hopping MAC Proposal", Jul. 2008, 33 pages.

\* cited by examiner

SYSTEM AND METHOD FOR MAINTAINING SYNCHRONIZATION WITH LOW POWER ENDPOINTS IN A TIME SYNCHRONIZED CHANNEL HOPPING NETWORK

RELATED APPLICATION

This application claims priority to U.S. Ser. No. 61/966,648 filed Feb. 26, 2014 entitled Maintaining Synchronization with a Low Power Endpoint in a Time Synchronized Channel Hopping Network, which is incorporated herein by reference.

TECHNICAL FIELD

The present invention is generally directed to maintaining synchronization while improving battery life for a low power endpoint in a time synchronized channel hopping network.

BACKGROUND

A network may include a number of Low Power Endpoints ("LPE"s). The LPEs are generally powered by a battery and the life of the battery is directly related to how frequently the endpoint communicates on the network. An LPE may be in communication with another node, which may have a more robust power source, such as utility mains. If so, then that node may act as a proxy and a buffer for the LPE and may help to extend the battery life of the LPE. It would be helpful to have additional power management practices to further extend the battery life.

In a time synchronized channel hopping network, such as that defined by IEEE 802.14e, synchronization of the endpoints or nodes of the network is critical to network stability and performance. When an LPE is connected to this type of network, the LPE is typically required to engage in frequent communications in order to remain synchronized with the network, which impacts the life of its battery.

SUMMARY

Systems and methods are disclosed for maintaining low power nodes synchronized on a time synchronized channel hopping network (TSCH). In one exemplary method, a low power endpoint (LPE) is associated with a parent node. The parent sends information regarding a guaranteed time slot and optionally a channel offset to the LPE.

The LPE determines a wake-up time that coincides with the next guaranteed time slot and then enters a low power mode until the wake-up time occurs. Once the wake-up occurs, the LPE enters a regular power mode and tunes to a channel associated with the guaranteed time slot. The LPE resynchronizes itself and then communicates as needed with the parent node. Upon completing any communication with the parent node, the LPE returns to a low power mode.

These illustrative aspects and features are mentioned not to limit or define the invention, but to provide examples to aid understanding of the inventive concepts disclosed in this application. Other aspects, advantages, and features of the present invention will become apparent after review of the entire application.

BRIEF DESCRIPTION OF THE FIGURES

These and other features, aspects, and advantages of the present disclosure are better understood when the following Detailed Description is read with reference to the accompanying drawings, where.

DETAILED DESCRIPTION

Systems and methods are provided for maintaining synchronization of a low power endpoint ("LPE") in a time synchronized channel hopping (TSCH) network that helps to minimize the power used by the LPE. In a TSCH network, such as that defined by IEEE 802.14e, Medium Access Control ("MAC") time is critical since small offsets between nodes may result in network instability and reduced node connectivity. Generally, nodes rely on frequent communications to maintain synchronization. An LPE has a limited power source, such as a battery, and the invention balances the need for power management with the need for clock accuracy.

Figure 1:
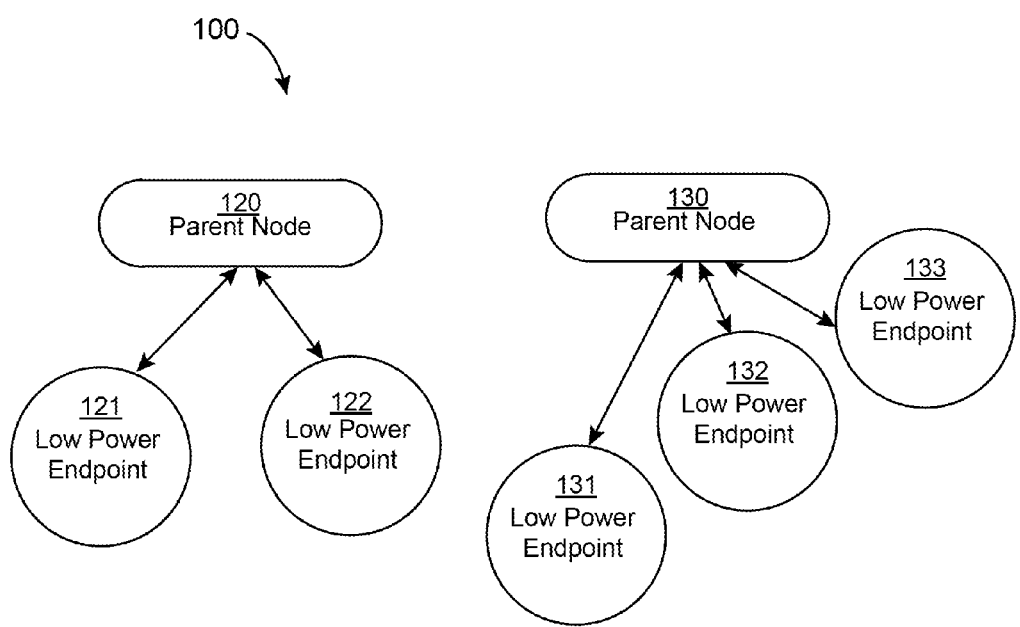
FIG. 1 is diagram of a portion of an exemplary network, including a number of low power endpoints ("LPE"s)

An exemplary mesh network 100 as shown in FIG. 1 includes multiple nodes, including parent nodes and child nodes. In FIG. 1, all of the illustrated child nodes are LPEs (121, 122, 131, 132, 133). The parent nodes 120, 130 may be powered by utility mains or other "robust" power source, whereas the LPEs may be powered by batteries or other limited power sources. As shown in FIG. 1, LPEs 121 and 122 are associated with parent node 120 and LPEs 131, 132, and 133 are associated with parent node 130. Although not shown in FIG. 1, the network may also include additional nodes that are associated with one or both of the parent nodes that operate differently than the LPEs and the parent nodes may be connected to each other or to other nodes (not shown) either directly or through intervening nodes. The association between nodes, such as the association between an LPE and its parent node, may be established in a variety of ways and may change over time.

Figure 2:
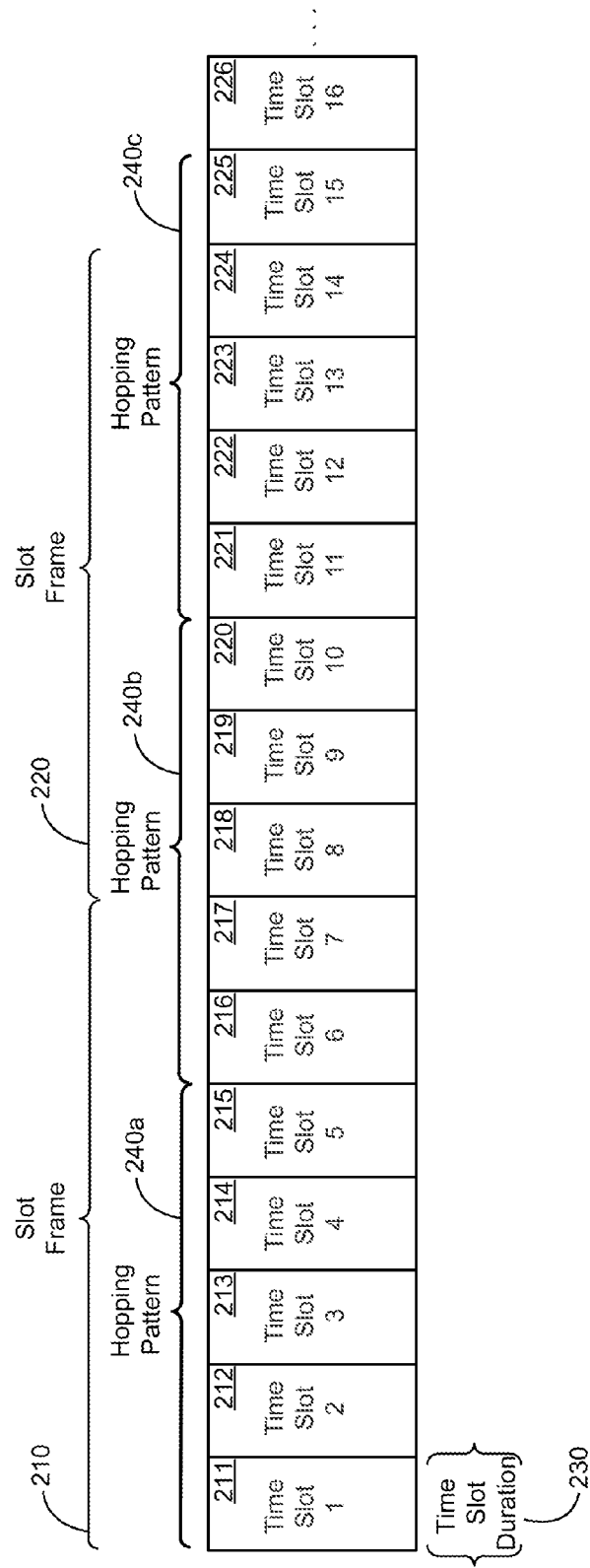
FIG. 2 is a diagram illustrating exemplary time slots for a TSCH network.

A TSCH network uses a series of time slots and multiple channel frequencies for communication between nodes. Multiple time slots may be grouped into a slot frame and multiple slot frames may be grouped into a super frame. Each time slot has a time slot duration of "T" which can be defined in milliseconds or other appropriate time unit. FIG. 2 illustrates time slots 211-226, each with the same time slot duration 230. Each slot frame 210 and 220 includes seven time slots. FIG. 2 also illustrates a hopping pattern 240a. A hopping pattern defines a channel frequency or channel for each time slot in the hopping pattern. For example, the hopping pattern 240a may be channel 4, channel 6, channel 3, channel 5, channel 7, i.e., it may associate channel 4 with time slot 1, channel 6 with time slot 2, channel 3 with time slot 3, channel 5 with time slot 4, and channel 7 with time slot 5. In FIG. 2 the hopping pattern 240a has a hopping pattern length of 5. The hopping pattern repeats. The first illustrated iteration of the hopping pattern 240a contains time slots 1-5 (211-215), the second iteration of the hopping pattern 240b contains time slots 6-10 (216-220), and the third iteration of the hopping pattern 240c contains time slots 11-15 (221-225). The number of time slots in a hopping pattern is independent of the number of time slots in a slot frame.

A parent node assigns a link to an LPE for a guaranteed time slot ("GTS") which is an assigned time slot for communication between the parent node and the LPE. In one implementation, the link includes a slot number from the slot frame and a channel offset. A GTS may be defined as a particular time slot within a slot frame, a super frame, or any other defined series of time slots. If a parent node is associated with multiple LPEs such as in FIG. 1, the parent node may assign a different guaranteed time slot to each LPE. For example, parent node 120 may assign a first GTS to LPE 121 and a second GTS to LPE 122. In some implementations, the parent node may also specify a channel offset in addition to the GTS. The channel offset indicates that communication will occur on a different channel than the channel indicated by the hopping pattern. For example, if the channel offset is 2 and the hopping pattern indicates that channel 3 is assigned to the GTS, then the parent node and the LPE communicate on channel 5, which is the sum of the channel number associated with the GTS and the channel offset (channel 3+2).

Because the LPE is assigned a GTS, the LPE can determine when it needs to be able to transmit or receive communications with its parent node. At other times, the LPE may enter a low power mode or go to sleep. In low power mode, the LPE maintains a clock so that it can determine when to wake up and enter regular power mode. Once the LPE determines that it is time to wake up, it reverts to regular power mode.

Communication between the parent node and the LPE is initiated during the GTS and may conclude during the GTS or may extend beyond the GTS. In one implementation, the LPE only transmits in response to a communication from the parent node. This allows the LPE to minimize its transmissions and conserve power. If the LPE does not receive a communication from the parent node that requires a response, then the LPE returns to a low power mode or goes to sleep without transmitting any messages.

In some implementations, the LPE wakes up at a time that approximates the start of the GTS, whereas in other implementations, the LPE wakes up earlier. For example, the LPE may wake up at a time that is one or more time slot durations prior to the start of the GTS. Waking up earlier allows the LPE additional time to resynchronize.

An LPE may include two clock devices, a low power mode clock and a regular power mode clock. If so, then the LPE may turn off or otherwise disable operation of its regular power mode clock while sleeping to conserve power. An LPE may use a temperature controlled oscillator ("TCXO") or other suitable device as its regular power mode clock to meet the strict timing requirements of a TSCH network. Since a more accurate device, such as a TCXO, typically uses more power than a less accurate device, the LPE may turn off its regular power mode clock while sleeping. When the LPE wakes up, it turns on its regular power mode clock so that once the LPE receives an initiation communication from the parent node, it can synchronize itself. In one implementation, the initiation communication includes a unique ID that identifies the message as an initiation communication. The initiation communication may also include timing information that the LPE needs to communicate with the parent node.

Figure 3:
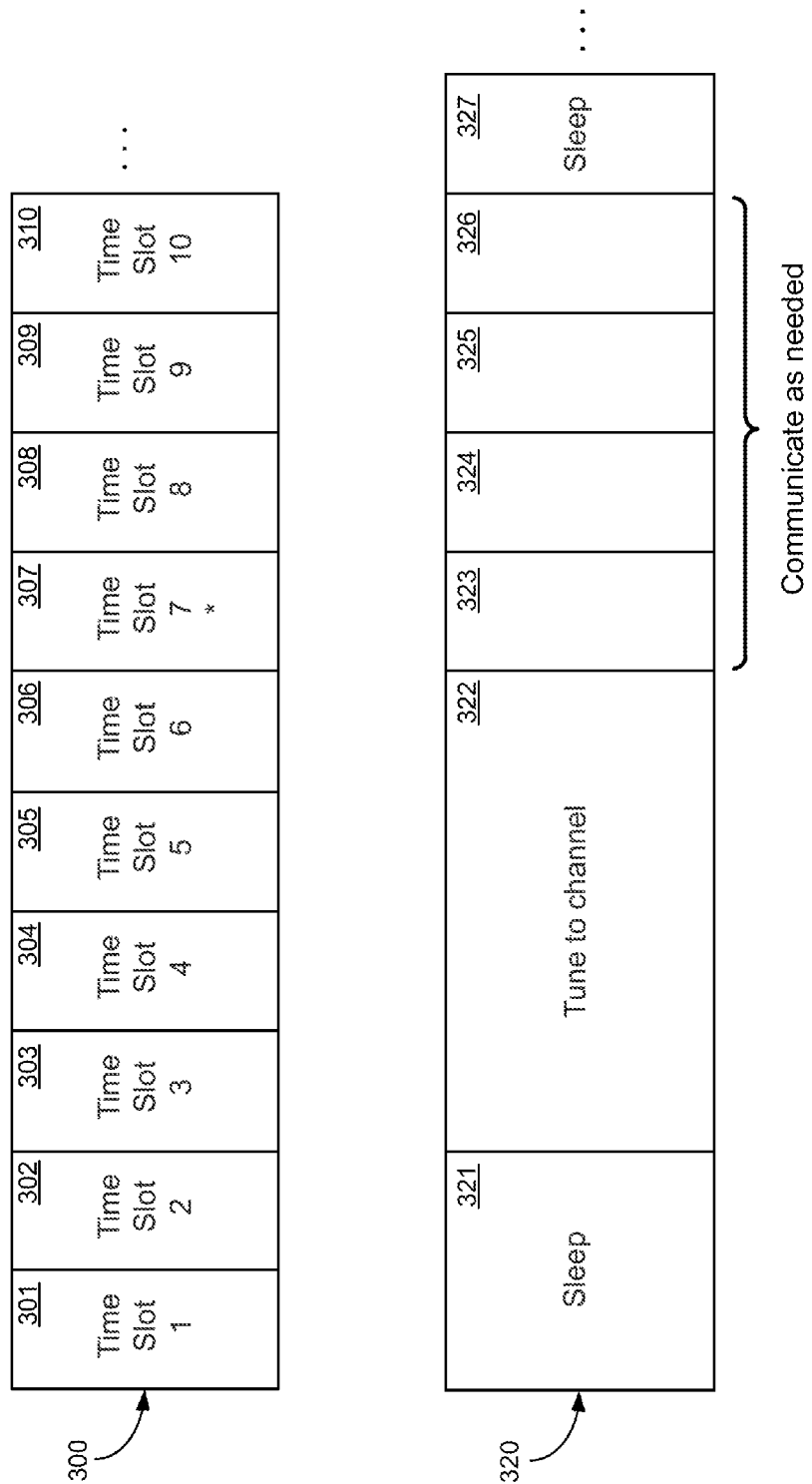
FIG. 3 is a diagram illustrating exemplary operation of an LPE on a TSCH network.

FIG. 3 illustrates the operation of an exemplary LPE at 320 which may be any of LPEs 121, 122, 131, 132, or 133 of FIG. 1. The operation of the parent node is illustrated at 300. The parent node previously assigned the time slot marked with an asterisk (*) to the LPE as its GTS. In FIG. 3, the GTS is time slot 7, 307. The LPE uses the GTS assignment link previously received from the parent node to determine a wake-up time and a channel. If the parent node also provided a channel offset, then the LPE also uses that information to determine the channel. The wake-up time may be a time prior to the start of the GTS to accommodate any time drift that the LPE may have accumulated. In FIG. 3, the LPE is sleeping at 321 and then wakes up at 322, which is approximately four time slots before the GTS. If each time slot is approximately 25 ms, then in this example the LPE wakes up approximately 100 ms before the start of the GTS. Although FIG. 3 illustrates that the LPE wakes up four time slots prior to the GTS, the number of time slots or time may vary for other implementations. For example, the LPE may wake up closer to the time when the GTS begins. In addition, the LPE may wake up at a time other than the start of a time slot. Once the LPE wakes up, it synchronizes itself to the parent node so that the LPE and the parent node may communicate. The parent node may send an initiation communication (not shown) to the LPE and the LPE may use the initiation communication for synchronization. FIG. 3 illustrates that the nodes use four time slots for communication 323-326. Once the communication is completed, the LPE goes back to sleep at 327. In situations where the LPE only transmits in response to a communication from the parent node, it is possible that the LPE wakes up, listens, and then returns to sleep without transmitting anything.

Figure 4:
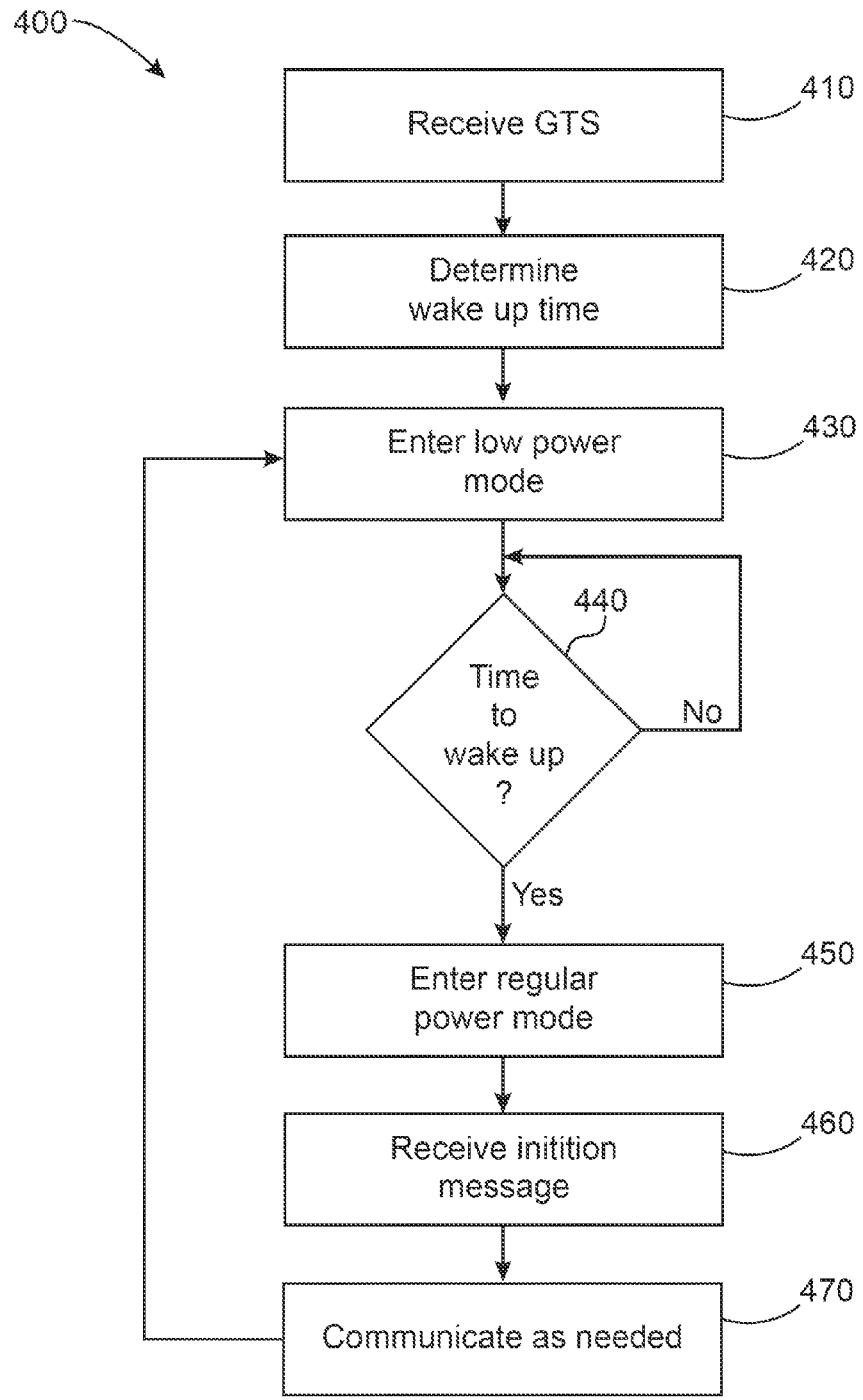
FIG. 4 is a flowchart illustrating maintaining synchronization of an LPE on a TSCH network.

FIG. 4 illustrates a process 400 for maintaining synchronization between nodes while conserving power in a TSCH network. At block 410, the LPE receives or is provided a GTS, which optionally includes a channel offset. At block 420, the LPE determines a wake-up time. The wake-up time may correspond to a time at or near the start of the GTS or may correspond to a time that is one or more time slots prior to the start of the GTS. The wake-up time for a particular system may be based, at least in part, on the accuracy of the LPE hardware, e.g., the oscillator and/or crystal, and the length of time between synchronization communications from the parent node.

At block 430, the LPE enters a low power mode. In some implementations, the LPE turns off its regular power mode clock when it enters low power mode. The process proceeds to block 440 and remains there by following the No branch until it is time for the LPE to wake up. When the LPE determines that it is time to wake up, the process follows the Yes branch and proceeds to block 450 where the LPE enters regular power mode. If the regular power mode clock was turned off at block 430, then the regular power mode clock is turned on at block 450. At block 460, the LPE receives an initiation communication from the parent node and resynchronizes itself. At block 470, the LPE listens for a communication and/or communicates with the parent node. Once any communication is completed, the LPE returns to low power mode at block 430.

Although FIG. 4 illustrates that the process proceeds from block 470 to block 430, other implementations may proceed differently. For example, the process could proceed from block 460 or 470 to block 410 or 420. The process may proceed to block 410, if the parent node reassigns the GTS for the LPE. The process may proceed to block 420 if the LPE needs to determine a wake up time for the next GTS. If the LPE does not receive the initiation communication or cannot communicate with the parent node, then the process may timeout and proceed to block 410 or 420.

Figure 5:
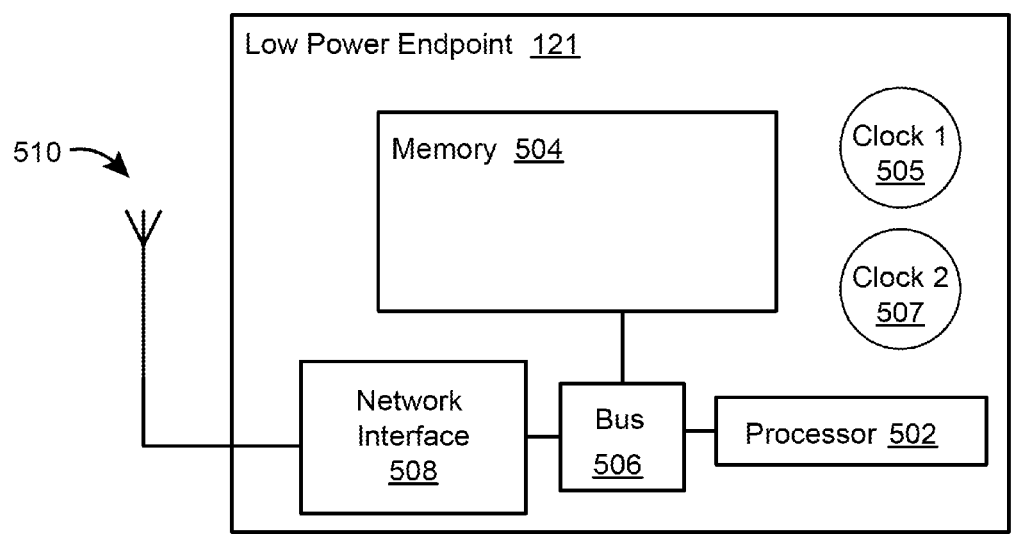
FIG. 5 is a block diagram of an exemplary LPE.

Next, FIG. 5 is a block diagram depicting an example of a LPE used for implementing the techniques disclosed herein within a wireless TSCH network. Endpoint node 121 may be any of the LPEs 122, 131, 132, 133 shown in FIG. 1. The LPE 121 may include a processing device 502.

Non-limiting examples of the processing device 502 include a microprocessor, an application-specific integrated circuit ("ASIC"), a state machine, or other suitable processing device. Processing device 502 can be communicatively coupled to computer-readable media, such as memory device 504. The processing device 502 can execute computer-executable program instructions and/or access information respectively stored in the memory device 504.

The memory device 504 can store instructions that, when executed by the processing device 502, cause the processing device 502 to perform operations described herein. The memory device 504 may be a computer-readable medium such as (but not limited to) an electronic, optical, magnetic, or other storage device capable of providing a processor with computer-readable instructions. Non-limiting examples of such optical, magnetic, or other storage devices include read-only ("ROM") device(s), random-access memory ("RAM") device(s), magnetic disk(s), magnetic tape(s) or other magnetic storage, memory chip(s), an ASIC, configured processor(s), optical storage device(s), or any other medium from which a computer processor can read instructions. The instructions may comprise processor-specific instructions generated by a compiler and/or an interpreter from code written in any suitable computer-programming language. Non-limiting examples of suitable computer-programming languages include C, C++, C#, Visual Basic, Java, Python, Perl, JavaScript, and the like.

FIG. 5 illustrates two clocks, a first clock used for regular power mode 505 and a second clock 507 used for both regular and low power modes. Other implementations may use a different number of clocks.

LPE 121 can include a bus 506 that can communicatively couple one or more components of the LPE 121. Although the processor 502, the memory 504, and the bus 506 are depicted in FIG. 5 as separate components in communication with one another, other implementations are possible. For example, the processor 502, the memory 504, and the bus 506 can be components of printed circuit boards or other suitable devices that can be disposed in LPE 121 to store and execute programming code.

LPE 121 can also include network interface device 508. The network interface device 508 can be a transceiving device configured to establish wireless communication links via an antenna 510. A non-limiting example of the network interface device 508 is an RF transceiver and can include one or more components for establishing a communication link to other nodes in the network 100.

General Considerations

These examples given are only for illustrative purposes and not meant to limit the invention to these devices. While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation and does not preclude inclusion of such modifications, variations, and/or additions to the present subject matter as would be readily apparent to one of ordinary skill in the art. In particular, aspects of the invention may be used in nodes other than those that use a battery or other limited power source, the parent node may specify a time slot for communication with an LPE in ways other than those described herein, and the nodes may not be related as parent-child nodes.

What is claimed is:

1. A method performed by a first node on a network, comprising:
    receiving information regarding a guaranteed time slot for communication with a second node on the network, wherein the information includes a time slot assignment for the guaranteed time slot, and wherein the network is a time synchronized channel hopping network;
    determining a wake-up time based on the time slot assignment for the guaranteed time slot;
    entering a low power mode;
    remaining in the low power mode for a plurality of time slots;
    when the wake-up time occurs, entering a regular power mode;
    determining a channel associated with the guaranteed time slot based on the time slot assignment for the guaranteed time slot and a hopping pattern, wherein the hopping pattern defines a repeating sequence of frequencies, and each time slot is associated with one of the frequencies from the hopping pattern;
    tuning to the channel associated with the guaranteed time slot;
    receiving a message from the second node via the channel during the guaranteed time slot, wherein the message includes an identifier that identifies the message as an initiation communication;
    in response to receiving the initiation communication, using information provided by the initiation communication to synchronize with the second node;
    transmitting a communication from the first node to the second node on the channel; and
    returning to the low power mode.

2. The method as in claim 1, wherein the information regarding the guaranteed time slot includes a channel offset and wherein tuning to a channel associated with the guaranteed time slot comprises tuning to a channel having a channel number that corresponds to a sum of a channel number that corresponds to the guaranteed time slot and the channel offset.

3. The method as in claim 1, further comprising:
    wherein transmitting a communication from the first node to the second node on the channel is performed in response to receiving a communication from the second node requesting a communication from the first node.

4. The method as in claim 1, wherein entering a low power mode comprises disabling operation of a clock device, and wherein entering a regular power mode comprises enabling operation of the clock device.

5. The method as in claim 4, wherein using information provided by the initiation communication to synchronize with the second node comprises synchronizing the clock device.

6. The method as in claim 1, wherein determining a wake-up time comprises determining a wake-up time that corresponds to a start of the guaranteed time slot.

7. The method as in claim 1, wherein the wake-up time occurs at least one time slot duration prior to a start of the guaranteed time slot.

8. The method as in claim 1, wherein the guaranteed time slot is defined by Institute of Electrical and Electronics Engineers (IEEE) 802.15.4e-2012.

9. A first node, comprising:
    a processor;
    a network interface for communicating on a network;
    a regular power mode clock device;

a low power mode clock device; and a memory configured to store instructions that when executed by the processor cause the first node to:

receive information regarding a guaranteed time slot from a second node on the network via the network interface, wherein the information includes a time slot assignment for the guaranteed time slot, and wherein the network is a time synchronized channel hopping network;

determine a wake-up time based on the time slot assignment for the guaranteed time slot;

enter a low power mode, including disabling operation of the regular power mode clock;

remain in the low power mode for a plurality of time slots;

use the low power mode clock to determine when the wake-up time occurs;

when the wake-up time occurs, enable operation of the regular power mode clock, enter a regular power mode, and tune to a channel associated with the guaranteed time slot, wherein the channel associated with the guaranteed time slot is based on the time slot assignment for the guaranteed time slot and a hopping pattern, wherein the hopping pattern defines a repeating sequence of frequencies, and each time slot is associated with one of the frequencies from the hopping pattern;

receive a message from the second node via the network interface and the channel during the guaranteed time slot, wherein the message includes an identifier that identifies the message as an initiation communication; and in response to receiving the initiation communication, use information provided by the initiation communication to synchronize with the second node;

transmit a communication from the first node to the second node on the channel; and return to the low power mode.

10. The first node as in claim 9, wherein the regular power mode clock device is more accurate than the low power mode clock device.

11. The first node as in claim 9, wherein the regular power mode clock device is a temperature controlled oscillator.

12. The first node as in claim 9, wherein the memory is further configured to store instructions that when executed by the processor cause the first node to: transmit a communication from the first node to the second node on the channel occurs in response to the first node receiving a communication from the second node requesting a communication from the first node via the network interface.

13. The first node as in claim 9, wherein the wake-up time corresponds to a start of the guaranteed time slot.

14. The first node as in claim 9, wherein the wake-up time corresponds to a time that is at least one time slot duration prior to a start of the guaranteed time slot.

15. The first node as in claim 9, further comprising a limited power source for powering the first node.

16. The first node as in claim 15, wherein the limited power source is a battery.

17. A method performed by a first node on a time synchronized channel hopping network, comprising:

receiving information regarding a guaranteed time slot for communication with a second node on the network, wherein the information includes a time slot assignment for the guaranteed time slot;

determining a wake-up time based on the time slot assignment for the guaranteed time slot, wherein the wake-up time corresponds to a time that is at least one time slot duration prior to the guaranteed time slot;

entering a low power mode;

remaining in low power mode for a plurality of time slots;

when the wake-up time occurs, entering a regular power mode;

determining a channel associated with the guaranteed time slot based on the time slot assignment for the guaranteed time slot and a hopping pattern, wherein the hopping pattern defines a repeating sequence of frequencies, and each time slot is associated with one of the frequencies from the hopping pattern;

tuning to the channel associated with the guaranteed time slot;

receiving a message from the second node via the channel during the guaranteed time slot, wherein the message includes an identifier that identifies it as an initiation communication;

in response to receiving the initiation communication, using information provided by the initiation communication to synchronize with the second node;

communicating with the second node during the guaranteed time slot via the channel; and returning to the low power mode.

18. The method as in claim 17, wherein entering a low power mode comprises disabling operation of a clock device, and wherein entering a regular power mode comprises enabling operation of the clock device.

19. The method as in claim 17, wherein tuning to a channel comprises tuning to a channel having a channel number that corresponds to a sum of a channel number that corresponds to the guaranteed time slot and a channel offset.

20. The method as in claim 19, wherein the channel offset is received from the second node.

* * * * *